United States Patent [19]

Sugiyama et al.

[11] Patent Number: 4,969,009
[45] Date of Patent: Nov. 6, 1990

[54] IMAGE RECORDING APPARATUS

[75] Inventors: Kazuhide Sugiyama; Masahiro Shirai, both of Tokyo; Kyoichi Ando, Yokohama; Yasuyuki Aikou, Yokohama, all of Japan

[73] Assignee: Canon Kabushiki Kaisha, Tokyo, Japan

[21] Appl. No.: 265,757

[22] Filed: Nov. 1, 1988

[30] Foreign Application Priority Data

Nov. 6, 1987 [JP] Japan ................. 62-280402
Nov. 6, 1987 [JP] Japan ................. 62-280403
Nov. 6, 1987 [JP] Japan ................. 62-280405
Nov. 6, 1987 [JP] Japan ................. 62-280408
Nov. 6, 1987 [JP] Japan ................. 62-280411

[51] Int. Cl.⁵ .................. G03B 27/32; G03B 27/52
[52] U.S. Cl. ................................ 355/64; 355/23
[58] Field of Search ............... 355/308, 309, 316, 321, 355/23, 24, 21, 64, 66, 67, 75, 65, 93, 50, 57

[56] References Cited

U.S. PATENT DOCUMENTS 2,984,150 12/1956 Osgood, Jr. .................. 355/24
4,190,353 2/1980 LaRue, Jr. .................... 355/24
4,583,844 4/1986 Honda ......................... 355/309
4,731,639 3/1988 Gutmann et al. ............... 355/64

Primary Examiner—Michael L. Gellner
Assistant Examiner—Khanh Dang
Attorney, Agent, or Firm—Fitzpatrick, Cella, Harper & Scinto

[57] ABSTRACT

An image recording apparatus comprises first feed means for feeding a document placed at a supply unit to a record unit;

record means for recording an image of the document fed to the record unit onto a recording medium;

second feed means for feeding the document fed to the record unit to an ejection unit;

a document feed path extending from the supply unit to the ejection unit through the record unit, including a first path connecting the supply unit and the record unit and a second path arranged above the first path and connecting the record unit and the ejection unit, the second path being able to be opened and closed relative to the first path; and a cover member for covering the document feed path, the cover member being able to be opened and closed relative to the second path.

11 Claims, 16 Drawing Sheets

IMAGE RECORDING APPARATUS

BACKGROUND OF THE INVENTION

1. Field of the Invention

The present invention relates to an image recording apparatus for recording an image of a sheet-like document such as bill or check onto a recording medium such as microfilm.

2. Related Background Art

As an image recording apparatus of this type, a rotary microfilm camera shown in FIG. 23 has been known. A sheet-like object S' such or a check as a document is fed into a photographing unit 101 of the apparatus from a front supply unit 100, and the sheet-like object S', after having been photographed, is ejected to an ejection unit arranged above the front supply unit 100. Since the supply unit 100 and the ejection unit 102 are arranged on the front of the apparatus, the operability is enhanced. A feed path of the object S' in the apparatus is a two-stage vertical structure with an upstream feed unit 103 for feeding the object S' from the supply unit 100 to the photographing unit 101 and a downstream feed unit 104 for feeding the object S' from the photographing unit 101 to the ejection unit 102. The object S' fed into the apparatus from the supply unit 100 passes through the upstream and downstream feed units 103 and 104 and makes a U-turn.

The photographing unit 101 comprises two parallel guide glass plates 105 and 105' for guiding the object S'. An image of the object S' illuminated by illumination lamps 106 and 106' through the guide glass plates 105 and 105' is focused onto a microfilm (not shown) through an optical system comprising mirrors 107 and 107'.

In such a prior art apparatus, a process to eliminate jam when the object S' jams in the feed path in the apparatus is troublesome. In the prior art apparatus, a number of covers are provided around the feed paths to facilitate the jam elimination process, but if jamming occurs in the lower stage upstream feed unit 103, the jam elimination process is impeded by the downstream feed unit 104 and the mirrors 107 and 107' which are above the upstream feed unit 103.

For example, where covers are provided on the front and back of the apparatus, the jam elimination process for the upper stage downstream feed unit 104 may be done but the jam elimination process for the upstream feed unit 103 is impeded by the downstream feed unit 104 so that an operator is difficult or impossible to manually eliminate the jam. On the other hand, where covers are provided on the side of the apparatus so that the jam elimination process may be done from the side, side plates to support feed rollers of the feed units 103 and 104, the guide glass plate 105 and the mirror 107 are required on the sides of the apparatus. As a result, the side plates impede the jam elimination process and an effective area for the jam elimination process is not provided.

Where a number of covers for the jam elimination process are provided on the front rear and side of the apparatus, the size of the apparatus increases because of spaces required around the covers to permit insertion of the operator's hand, and the position of the jam of the object may not be detected until a number of covers are opened. In a compact size apparatus, spaces permitted for the jam elimination process are too small to allow a user to effect the jam elimination process.

In the object feed path, it is difficult to check and maintain belts and rollers of the upstream and downstream feed units 103 and 104 or the guide glass plates 105 and 105' and the mirror 107 of the photographing unit 101. In the rotary camera, the object sheet S' is frequently fed at a high speed (approximately 50 m/min). Thus, paper flakes are produced by the object and hence the apparatus with a high maintenability is desired.

In a prior art apparatus, in order to enhance the operability of the operator, a film chamber in which a film is loaded is also provided on the front of the apparatus so that the film can be exchanged from the front of the apparatus as the object is loaded from the front.

In such a prior art apparatus, a film supply reel in the film chamber is vertically mounted and an exposure plane of the film is directed upward. As a result, in order to direct the optical path of the image of the object S' sent from the photographing unit 101 through the optical systems 107 and 107', to the film exposure plane, it is necessary to arrange a reflection mirror for deflecting the optical path to the above of the film. A focusing lens is arranged above the film exposure plane. If the reflection mirror is to be arranged further above the lens, the size of the apparatus naturally increases. The height of the reflection mirror may be reduced to save a space. In this case, however, the mirror and the lens are so close that a high precision is required for the reflection plane of the mirror.

A sensor $S_1$ for detecting the feed of the object S' when the image of the object S' is to be photographed onto the microfilm is provided in the upstream feed unit 103. The exposure is done in accordance with a signal from the sensor $S_1$ so that the image of the object S' is recorded on the microfilm.

A feed guide 110 for smoothly feeding the object S' is provided above the upstream feed unit 103. In order to facilitate the cleaning of the feed unit 103 and the jam elimination process, the feed guide 110 is movable in a direction of an arrow A and it can be latched at an open position.

A sensor $S_2$ for detecting the position of the feed guide 110 to prevent the jam due to failure to close the feed guide 110 is provided in the vicinity of the feed guide 110. When the feed guide 110 is not in the closed position, the sensor $S_2$ detects it and sends a signal for indication.

However, in such a prior art apparatus, since the sensor $S_1$ for detecting the object and the sensor $S_2$ for detecting the position of the feed guide 110 are separately provided, the construction of the apparatus is complex and of large scale, and the cost increases.

When dust or paper flake of the object S' deposits on the sensor $S_1$ or $S_2$ during the use of the apparatus, the sensitivity of the sensor lowers. When the sensitivity of the object detection sensor $S_1$ lowers, the photographing may be done in error. Accordingly, the sensors $S_1$ and $S_2$ have to be cleaned occasionally.

However, since the sensors $S_1$ and $S_2$ are mounted at positions which are hard to manually access, the cleaning is difficult to do and the feed unit 103 must be disassembled. This is very troublesome.

SUMMARY OF THE INVENTION

It is an object of the present invention to provide an image recording apparatus which facilitates the jam elimination process for document, and inspection and maintenance of the inside of the apparatus.

It is another object of the present invention to provide a compact image recording apparatus of high operability.

It is other object of the present invention to provide a simpler image recording apparatus which facilitates cleaning and maintenance of the feed paths and sensors.

In accordance with one aspect of the present invention, the image recording apparatus has a supply unit on the front of the apparatus and for supplying a sheet-like document into the apparatus and an ejection unit for ejecting the document out of the apparatus after the recording operation. A feed path running from the supply unit to the ejection unit through a recording unit in the apparatus is of two-stage vertical structure having a lower stage upstream feed unit connecting the supply unit and the recording unit and an upper stage downstream feed unit connecting the recording unit and the ejection unit. A cover for the feed path is provided, and the downstream feed unit and the upstream feed unit can be individually moved to their open positions and closed positions, and said cover is movable to open and close the upstream feed unit.

In accordance with another aspect of the present invention, the image recording apparatus places the document in the recording unit in the apparatus with the plane of the document being directed in the front-to-back direction of the apparatus, and sequentially reflects the image light of the document onto a recording medium by a plurality of reflection means to record the image. The recording medium is arranged on the front of the apparatus and the last reflection means of the series of reflection means is arranged at the highest position among the reflection means and behind the recording medium. An angle mode by optical axes of an incident light of the image light to the last reflection means and a reflected light is an acute angle.

In accordance with a further aspect of the present invention, a guide member for guiding the document along the feed path is arranged to open and close the feed path, and detection means for detecting the open/close position of the guide member and detecting the document in the feed path is provided in the guide member.

DETAILED DESCRIPTION OF THE PREFERRED EMBODIMENTS

Figure 1:
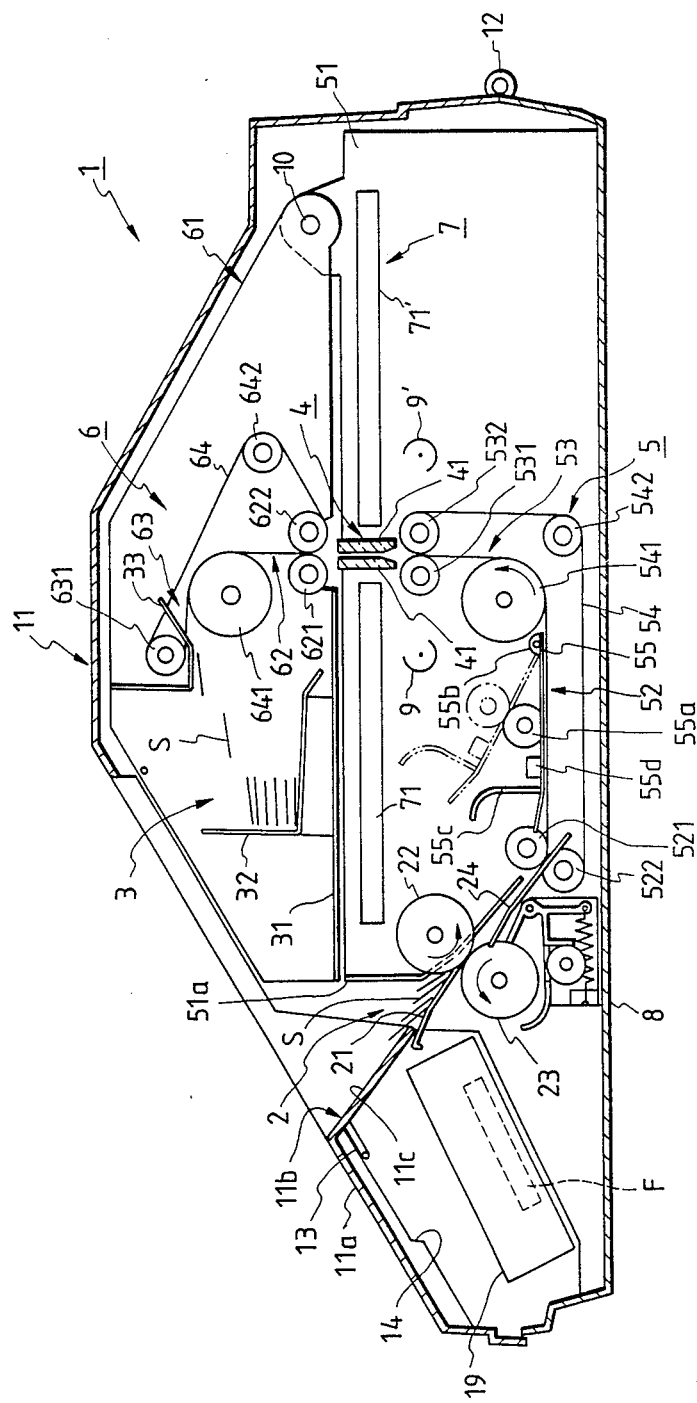
FIG. 1 shows a longitudinal sectional view of one embodiment of an image recording apparatus of the present invention.

Referring to FIGS. 1 to 11 which show one embodiment of the present invention, numeral 1 denotes an overall image recording apparatus. Specifically, a rotary camera which records an image of a sheet-like object S such as a check as a document on a web type microfilm F is explained. The image recording apparatus 1 comprises a supply unit 2 for supplying the object S into the apparatus, an ejection unit 3 for ejecting the object S out of the apparatus after the photographing, a photographing unit 4 as a recording unit arranged in the apparatus, an upstream feed unit 5 connecting the supply unit 2 and the photographing unit 4, and a downstream feed unit 6 connecting the photographing unit 4 and the ejection unit 3. The image of the object S fed to the photographing unit 4 is focused onto a microfilm F through an optical system 7.

The upstream feed unit 5 and the photographing unit 4 are arranged inside of a first frame 51 mounted on a base 8, and the supply unit 2 for the object S is arranged at a front end 51a of the first frame 51. The optical system 7 is arranged on a left side of the first frame 51 as viewed from the front of the apparatus, and a drive unit (not shown) is arranged on a right side. A film chamber 19 into which the film F is loaded is arranged in front of the supply unit 2 arranged on the front of the first frame 51. On the other hand, a second frame 61 is mounted on the first frame 51 through a rear end hinge unit 10 in such a manner that it can be opened forwardly, and the downstream feed unit 6 and the ejection unit 3 are arranged on the second frame 61. The outer cover 11 covers the entire apparatus and a lower edge thereof abuts against an edge of the base 8 and is attached to a rear end of the base 8 through the rear end hinge 10 in such a manner that it can be opened forwardly.

The supply unit 2, the ejection unit 3 and the film chamber 19 are collectively arranged on the front of the apparatus. A feed table 21 on which the object S is mounted is provided in the supply unit 2, and a vertical pair of feed roller 22 and a separation roller 23 are arranged at a rear end of the feed table 21. The feed table 21 is inclined downward in the depth direction of the apparatus, and the object S is slid along the inclined surface so that a leading edge of the object S abuts against the feed roller 22. As the feed roller 22 is rotated, the uppermost object S is fed into the apparatus, and the separation roller 23 is rotated in the opposite direction of the feed roller 22 so that the overlapping objects S are offset from each other to prevent double sheet feeding. On the other hand, a guide plate 24 for guiding the object S fed into by the feed roller 22 to a start end of the upstream feed unit 5 is arranged behind the feed roller 22.

The upstream feed unit 5 comprises a horizontal feed path 52 extending below the photographing unit 4 from the rear end of the supply unit 2 along the base 8, and a vertical feed path 53 extending to the lower edge of the photographing unit 4 from the rear end of the horizontal feed path 52. A pair of first and second rollers 521 and 522 are arranged at the front end of the horizontal feed path 52, and a pair of third and fourth rollers 531 and 532 are arranged at the upper end of the vertical feed path 53. A convey belt 54 spans between the second and fourth rollers 522 and 532. First and second guide rollers 541 and 542 for guiding the belt 54 such that it is bent at a right angle are arranged at the corners of the horizontal feed path 52 and the vertical feed path 53. Of the first and second guide rollers 541 and 542, the first guide roller 541 which contacts to the feed plane of the convey belt 54 has a larger diameter to smoothly guide the object S.

A guide plate 55 for guiding the object S fed over the horizontal feed path 52 is arranged on the convey belt 54 of the horizontal feed path 52. The guide plate 55 faces the convey belt 54 with a predetermined space therebetween, and the object S passes through the clearance between the guide plate 55 and the convey belt 54. A guide roller 55a is provided at a center of the guide plate 55 to guide the object S fed over the convey belt 54. The guide plate 55 has a rear end thereof pivoted to a side plate of the first frame 51 through a pivot 55b, and the front end is movable around the pivot 55b. In FIG. 1, an open position of the side plate 55 is shown by broken lines. On the other hand, a handle 55c for pulling up the guide plate 55 is provided at the front end of the guide plate 55. The guide plate 55 can be pulled up by the handle 55c and latched at a predetermined angle by latch means (not shown). A sheet sensor 55d for detecting jam of the sheet is provided on the guide plate 55 to detect the feed of the object S and the position of the guide plate 55.

The photographing unit 4 comprises a pair of parallel guide glass plates 41 and 42 supported by the upper end of the side plate of the first frame 51 on which the upstream feed unit 5 is mounted. The guide plane between the glass plates 41 and 42 is on an extended line from the vertical feed path 53 of the upstream feed unit 5. On the other hand, first reflection mirrors 71 and 71' which are parts of the optical system 7 are arranged on the guide glass plates 41 and 42 so that the images on the front and rear sides of the object S passing through the clearance between the guide glass plates 41 and 42 are directed onto the microfilm F. Numerals 9 and 9' denote illumination lamps for illuminating the front and rear sides of the object S passing through the clearance between the guide glass plates 41 and 42.

On the other hand, the downstream feed unit 6 comprises a vertical feed path 62 formed above the guide glass plates 41 and 42, and a horizontal feed path 63 extending from the upper end of the vertical feed path 62 to the front of the apparatus. The vertical feed path 62 and the vertical feed path 53 of the upstream feed path 5 are arranged symmetrically with respect to the guide glass plates 41 and 42, and the upstream vertical feed path 53, the guide glass plates 41 and 42 and the downstream vertical feed path 62 are on the same line. A pair of fifth and sixth rollers 621 and 622 are arranged at the start end of the downstream vertical feed path 62, and a seventh roller 631 is arranged at the end of the horizontal feed path 63. A convey belt 64 is spanned between the sixth roller 622 at the start end of the vertical feed path 62 and the seventh roller 631, and a third guide roller 641 is provided at the corner of the vertical feed path 62 and the horizontal feed path 63 to bent the feed plane of the belt 64. The third guide roller 641 has the same larger diameter as that of the first guide roller 541 of the upstream feed unit 5 so that the object S can be smoothly deflected. Numeral 642 denotes a fourth guide roller for preventing interference of the convey belt 64.

The fifth to seventh rollers 621, 622 and 631 and the third and fourth guide rollers 641 and 642 are mounted on a second frame 61 which is movably mounted, through the rear hinge 10, on the first frame 51 on which the upstream feed unit 5 is mounted. The second frame 61 is of generally trapezoidal shape in its side, vertical and horizontal feed units 62 and 63 are provided at a center, and a front-half thereof constitutes the ejection unit 3 to eject the object S.

A horizontal table 31 is arranged in the front-half of the second frame 61, and a stacker 32 for receiving the object S ejected from the apparatus is arranged on the table 31. A guide plate 33 is provided at the upper edge of the center of the second frame 61 to cover the rear end of the downstream horizontal feed path 63. The object S fed by the downstream feed unit 6 is guided by the guide plate 33 and received by the stacker 32.

Numeral 11 denotes an outer cover which covers the entire upstream and downstream feed units 5 and 6, and a lower end thereof engages with the peripheral edge of the base 8 to protect the entire apparatus. The rear edge is rotatably mounted to the rear edge of the base 8 on which the upstream feed unit 5 is mounted, through a hinge 12. The outer cover 11 has a generally trapezoidal shape in its side and a front plane 11a inclines forwardly. An opening 11b is formed on the front plane 11a so that the supply unit 2 for the object S and the ejection unit 3 are exposed to the external. The front edge of the opening 11b is located forwardly of the front end of the table 31 of the ejection unit 3, and the object S is supplied into the supply unit 2 through the clearance between the front end of the opening 11b and the front end of the table 31. A feed guide 11c which extends to the feed table 21 of the supply unit 2 is provided at the front edge of the opening 11b.

Figure 2:
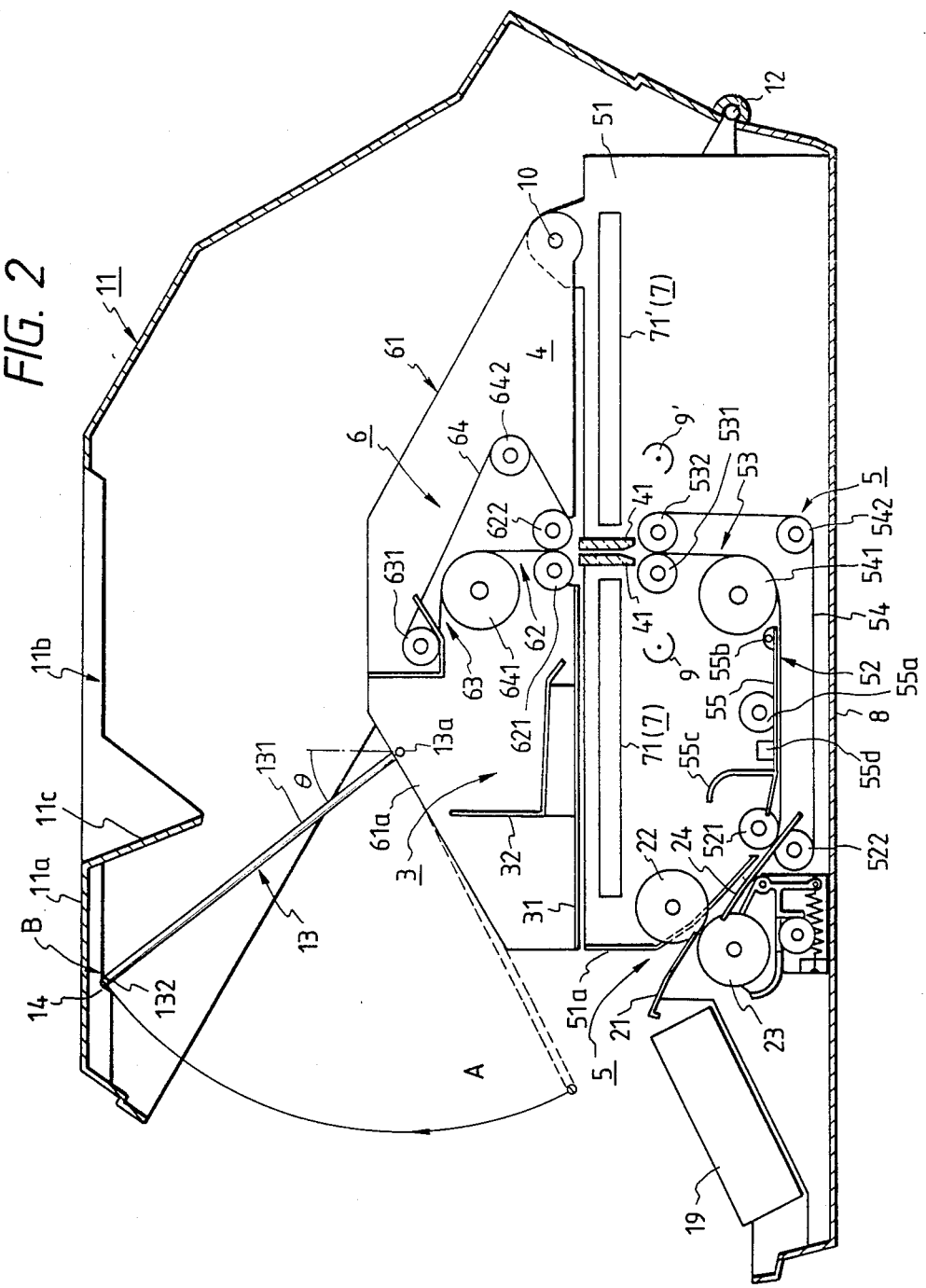
FIG. 2 shows a longitudinal sectional view of the apparatus of FIG. 1 with an outer cover being at an open position.

A lever 13 having one end thereof pivoted to the second frame 61 as shown in FIG. 2 is provided in the downstream feed unit 6. The lever 13 is rotated to follow the opening operation of the outer cover 11 and latched to a latch 14 formed on an inner surface of the outer cover 11 to hold the outer cover 11 at a predetermined open position. The lever 13 is rotated between the fully closed position A of the outer cover 11 and the intermediate hold position B. At the intermediate hold position B, the lever 13 is angled by θ forwardly of the apparatus with respect to a normal line. The leading end of the lower 13 abuts against the latch 14 from the rear thereof.

Figure 7:
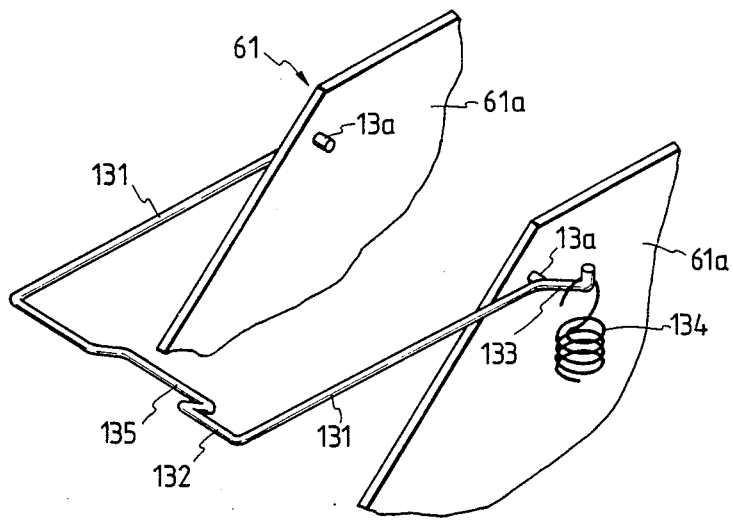
FIG. 7 shows a perspective view of another embodiment of the lever of FIG. 6.

The lever 13 is a U-shaped member having a substantially same width as that of the second frame 61, and comprises a pair of arms 131 and 131 to which ends of side plates 61a and 61a of the second frame 61 are pivoted, and a horizontal shaft 132 to which ends of the arms 131 and 131 are coupled. The pivot point 13a of the arm 131 is located near an uppermost portion of a front inclined side of the trapezoidal second frame side plate 61a, and it is located above the rear hinge 10 of the second frame 61 by the height of the second frame 61. The lever 13 is biased such that it is rotated upward around the pivot point 13a, and when the outer cover 11 is opened, the lever 13 follows the outer cover 11 and rotates upward. In the present embodiment, one of the arms 131 is extended slightly beyond the pivot point 13a to form a hook 133, and a spring 134 is mounted between the hook 133 and pin 61b provided on the second frame side plate 61a so that a moment is applied to the lever 13 by a tensional force of the spring 134. The horizontal shaft 132 of the lever is always urged to the inner surface of the outer cover 11 by the spring force of the spring 134 and the lever 13 is rotated to follow the opening operation of the outer cover 11. In the present embodiment, a stopper mechanism (not shown) is provided to position the lever 13 at the intermediate hold position B and restrain the rotation of the hook 133 of the lever 13. In FIG. 7, a handle 135 is provided on the horizontal shaft 132 of the lever 13. It facilitates the gripping of the horizontal shaft latched to the outer cover 11. The handle 135 is angled to the plane defined by the arms 131 and the horizontal shaft 132.

Figure 8:
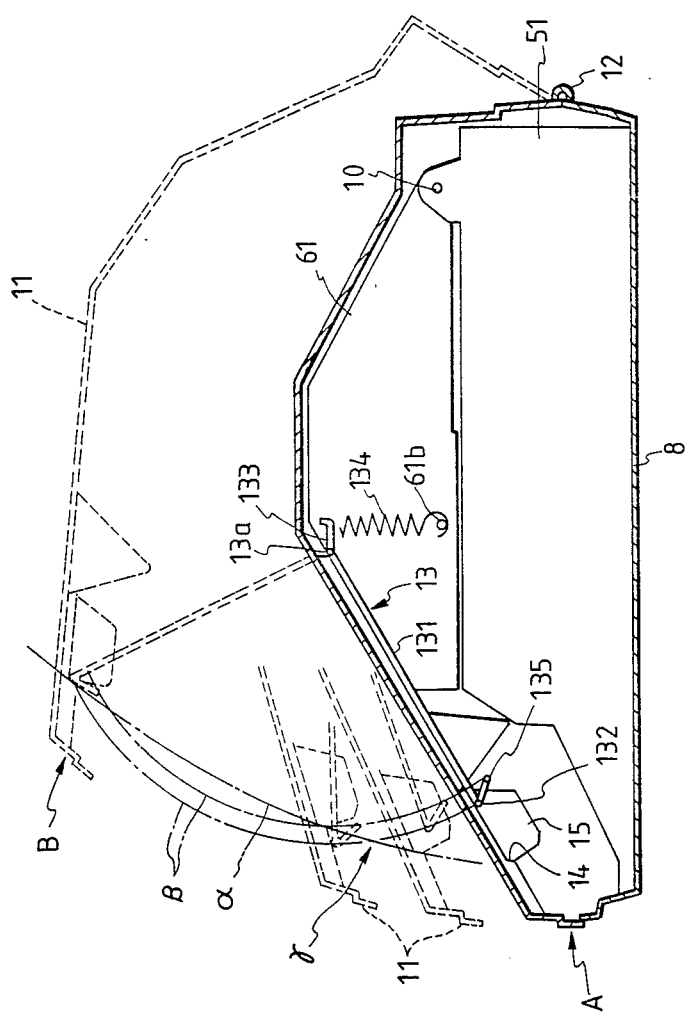
FIG. 8 shows a side view illustrating a lever relock prevention cam attached to the apparatus of FIG. 1.

In FIG. 8, a lock escape cam 15 to allow escape of the lock of the lever 13 is provided in the outer cover 11 to prevent the horizontal shaft 132 of the lever 13 from reengaging with the latch 14 to lock it. A rotation locus α of the latch 14 of the outer cover 11 is different from a rotation locus β of the leading end of the lever 13, and the rotation loci α and β cross at a point γ between the intermediate hold position B and the fully closed position A. Accordingly, between the intermediate hold position B and the cross point γ, the leading end of the lever 13 sides over the latch 14 and moves forward, but at the cross point γ, it returns to the latch 14. The horizontal shaft 132 may be relocked at this time. Thus, when the leading edge of the lever 13 relatively returns to the latch 14 of the outer cover 11, the horizontal shaft 132 at the leading edge of the lever is spaced apart from the inner surface of the outer cover 11 by the height of the latch 14. In the present embodiment, the cam 15 is designed such that the handle 135 on the horizontal shaft 132 at the end of the lever slides on the periphey so that a projection height from the inner surface of the outer cover 11 is large.

Figure 9:
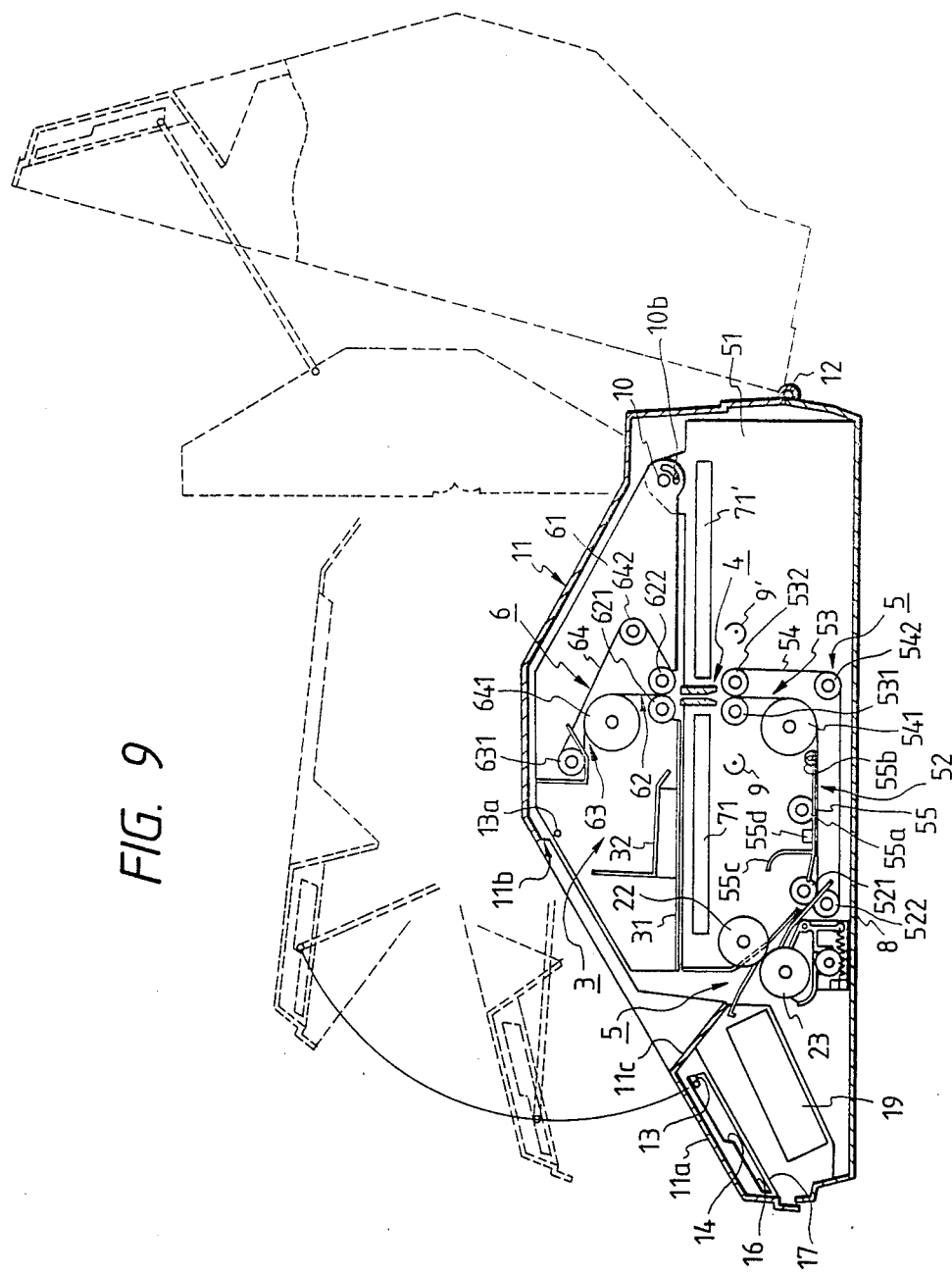
FIGS. 9 and 10 show longitudinal sectional views illustrating other embodiments of engagement of the lever and the outer cover of the apparatus of FIG. 1.

On the other hand, in FIG. 9, a slide guide 17 having a slot 17 into which the horizontal shaft 132 at the end of the lever is to be inserted is fixed to the inner surface of the outer cover 11. The outer cover 11 is connected to the second frame 61 of the downstream feed unit 6 through the lever 13. The slot 16 is long enough to absorb a difference between a rotation locus of the outer cover 11 and a rotation locus of the horizontal shaft 132 at the end of the lever 13. A latch 14 to which the lever 13 is latched is provided at an upper edge of the slot 16. Thus, when the outer cover is to be opened and the downstream feed unit 6 is to be opened, the outer cover 11 and the downstream feed unit 6 move in union and the operability is high. In the present embodiment, a stopper 10b for preventing the downstream feed unit 6 from falling backward is provided at the hinge 10.

Figure 10:
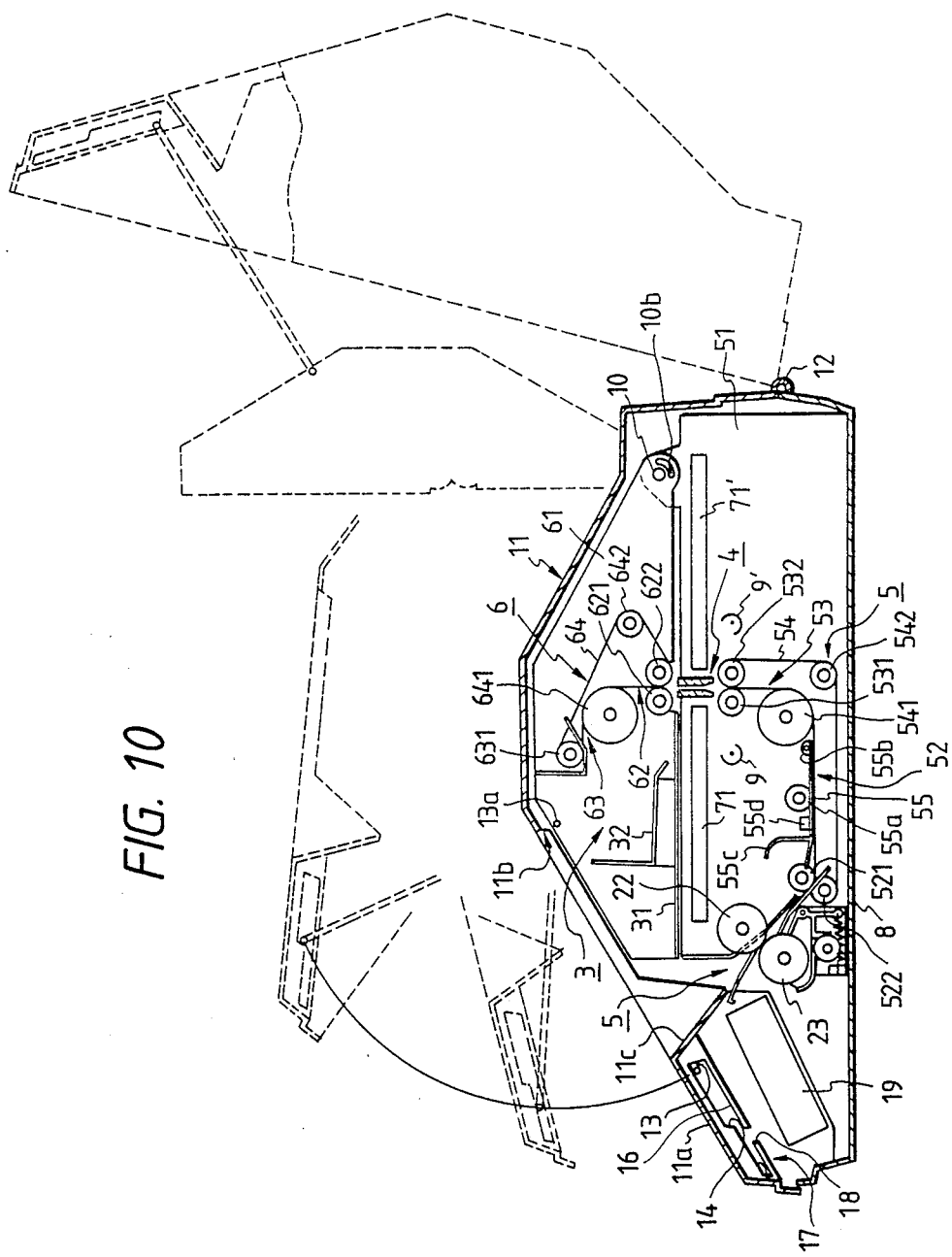

In FIG. 10, a notch 18 is provided at a lower edge of the slide guide 17 shown in FIG. 9 so that the horizontal shaft 132 at the end of the lever 13 can engage with and disengage from the slot 16. Thus, the outer cover 11 can be selectively coupled to the downstream feed unit 6 so that the outer cover 11 can be widely opened as required.

Figure 11:
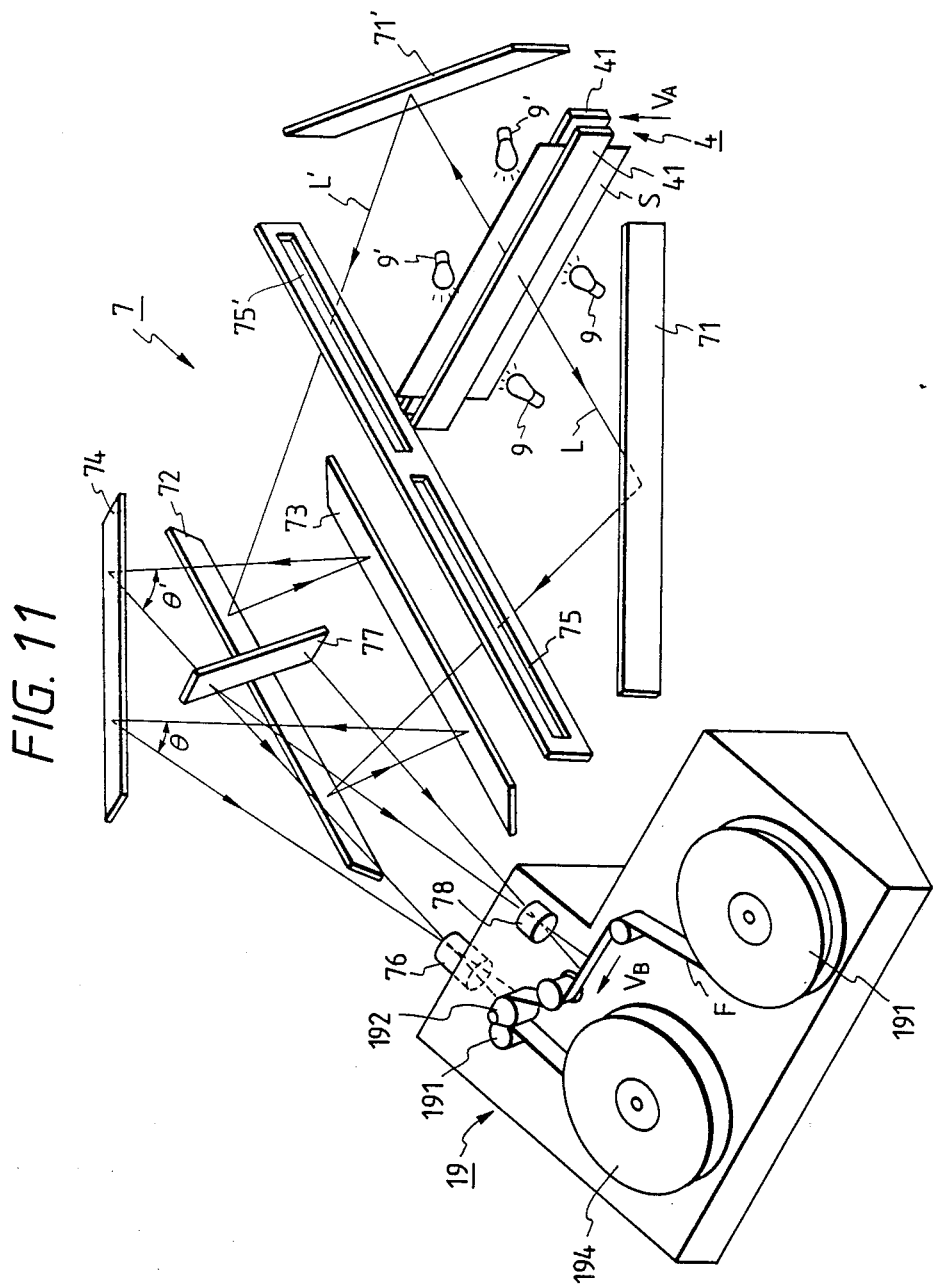
FIG. 11 shows a perspective view of arrangement of an optical system of the apparatus of FIG. 1.

FIG. 11 shows an arrangement of the optical system 7. Optical paths L and L' of the image lights of the front and back sides of the object S which pass through the photographing unit 4 located at the center in the apparatus are deflected by a plurality of mirrors which function as reflection means, that is, first to fourth mirrors 71, 72, 73 and 74 in the present embodiment, and they are focused onto a film F located in the front of the apparatus from the center of the apparatus through the left side of the first frame 51. The first mirrors 71 and 71' which face the front and back sides of the document or object S are arranged in front of and behind the pair of parallel guide glass plates 41 of the photographing unit 4. The first mirrors 71 and 71' are arranged at approximately 45 degrees to the pair of guide glass plates 41 so that they open from the left side of the apparatus, and they deflect the optical paths L and L' of the image lights of the front and back sides of the object S at substantially right angle from the front-to-back direction of the apparatus to the left side.

On the other hand, the second mirror 72 is arranged along the left side of the first frame 51 to face the first mirrors 71 and 71'. The second mirror 72 is of substantially same height as the first mirrors 71 and 71' and a reflection surface thereof is inclined downward to face the third mirror which is arranged below the second mirror 72. Slits 75 and 75' for restricting the optical paths L and L' are provided between the first mirrors 71 and 71' and the second mirror 72.

On the other hand, the fourth mirror 74 is arranged above the second mirror 72 and a reflection surface thereof faces the third mirror 73 and is inclined such that a spacing between the front end and the third mirror 73 is larger. The height of the fourth mirror 74 is highest among the first to fourth mirrors 71, 72, 73 and 74, and it is positioned behind the photographing unit 4.

The optical paths L and L' of the image lights of the front and back sides of the object S are deflected by the first mirrors 71 and 71' at substantially right angle from the front-to-back direction of the apparatus to the left side, and deflected downward by the second mirror 72. Then, they are deflected upward by the third mirror 73 and deflected forwardly of the apparatus by the fourth mirror 74. Then, they are focused onto the microfilm F (recording medium) through the focusing lens 76 arranged on the front side of the apparatus. The front and back side images of the object S are recorded in parallel on both sides of the film F.

The angles θ and θ' between the optical axis of the incident light directed from the third mirror 73 to the fourth mirror 74 and the optical axis of the reflection light directed from the fourth mirror 74 to the film F are acute so that the optical path of the reflection light from the fourth mirror 74 gradually inclines downward.

The microfilm F is supplied from a supply reel 191 on which an unexposed raw film is wound and taken up on a take-up reel 194 through a gap between a capstan roller 192 which faces the focusing lens 76 and a pinch roller 193. The image of the object S is exposed at the capstan roller 192 through a slit. A velocity $V_B$ of the microfilm F is synchronized with a velocity $V_A$ of the object S which passes through the guide glass plates 41 of the photographing unit 4, in accordance with a magnification.

The film chamber 19 is inclined such that the rear thereof is raised so that the exposure surface of the microfilm F faces normally to the optical path extending from the fourth mirror 74.

On the other hand, numeral 77 denotes a data indicator to indicate data such as date. It is mounted on the side plate of the second frame 61. The data is focused onto the microfilm F through a data focusing lens 78 other than the focusing lens 76.

In the image recording apparatus of the present embodiment, the object S fed from the supply unit 2 to the photographing unit 4 through the upstream feed unit 5 is illuminated by the illumination lamps 9 and 9' arranged to illuminate the front and back sides of the object S. The image lights of the front and back side images of the object S are sequentially deflected by the first to fourth mirrors 71, 71', 72, 73 and 74 and focused onto the film F arranged at the front end of the apparatus by the focusing lens 76. The object S and the film F are moved in synchronism with the reduction ratio therebetween and the images are continuously exposed through the slits 75 and 75'.

Since the film chamber 19 is arranged in the front of the apparatus as are the supply unit 2 and the ejection unit 3 for the object S, the film may be loaded and unloaded in the same direction as that for loading and unloading the object S, and the efficiency of work is improved.

Since the last fourth mirror 74 is located behind the photographing unit 4 of the apparatus and largely spaced from the focusing lens 76, it is not necessary to polish the reflection surface of the fourth mirror 74 at a high precision. Since the angle between the optical axis of the incident light to the fourth mirror 74 and the optical axis of the reflection light is acute, the optical path extending from the fourth mirror 74 to the film F inclines forwardly downward so that a front space of the apparatus may be saved. In the present embodiment, since the optical path extending from the fourth mirror 74 to the film F is inclined, the film chamber 19 may also be inclined with the rear thereof being raised. When an operator exchanges the film from the front of the apparatus, he/she loads and unloads the supply reel 191 and the take-up reel 194 obliquely downward. Accordingly, the operator is easy to watch the console panel and the work is facilitated.

Figure 3:
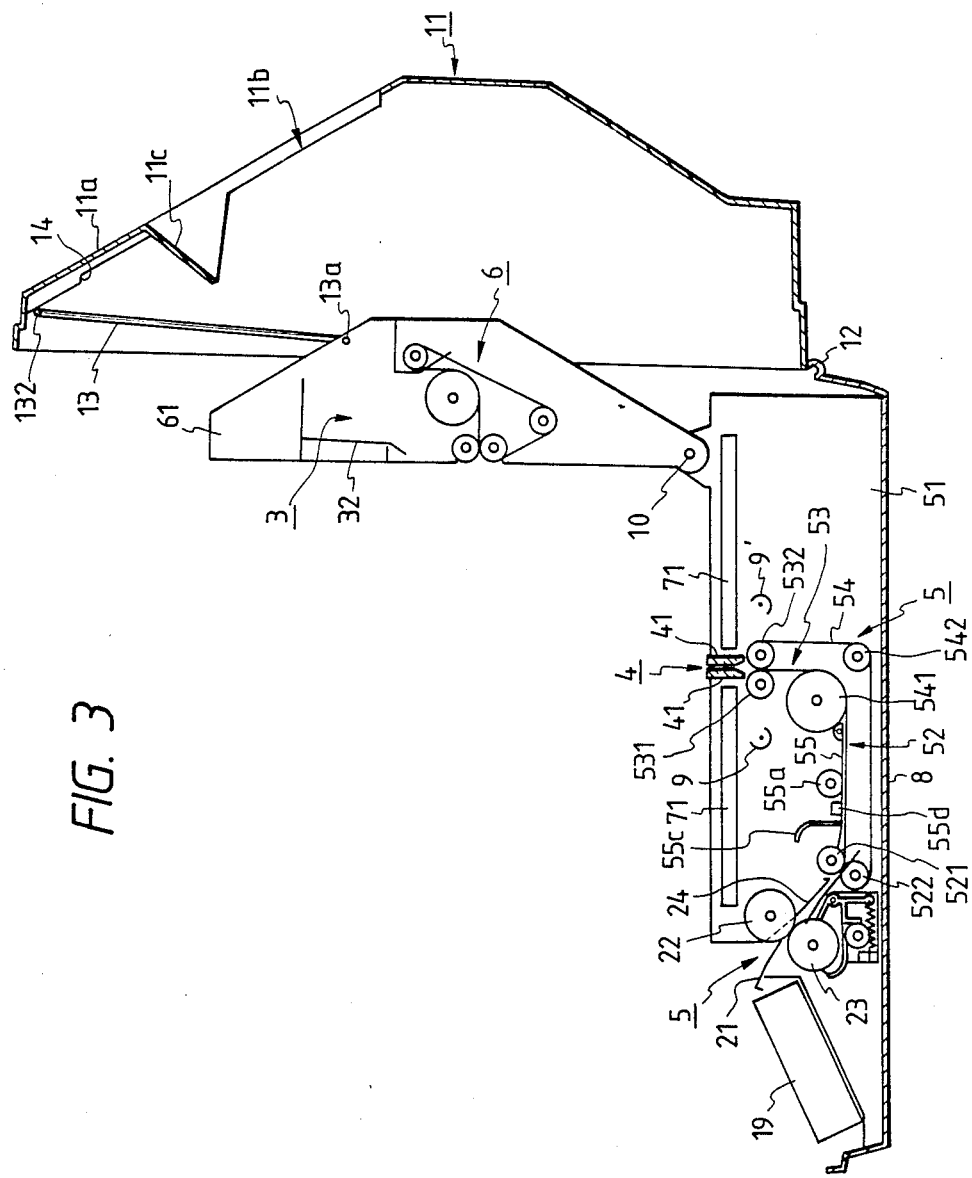
FIG. 3 shows a longitudinal sectional view of the apparatus of FIG. 1 with the outer cover and a downstream feed unit being at open positions.
Figure 4:
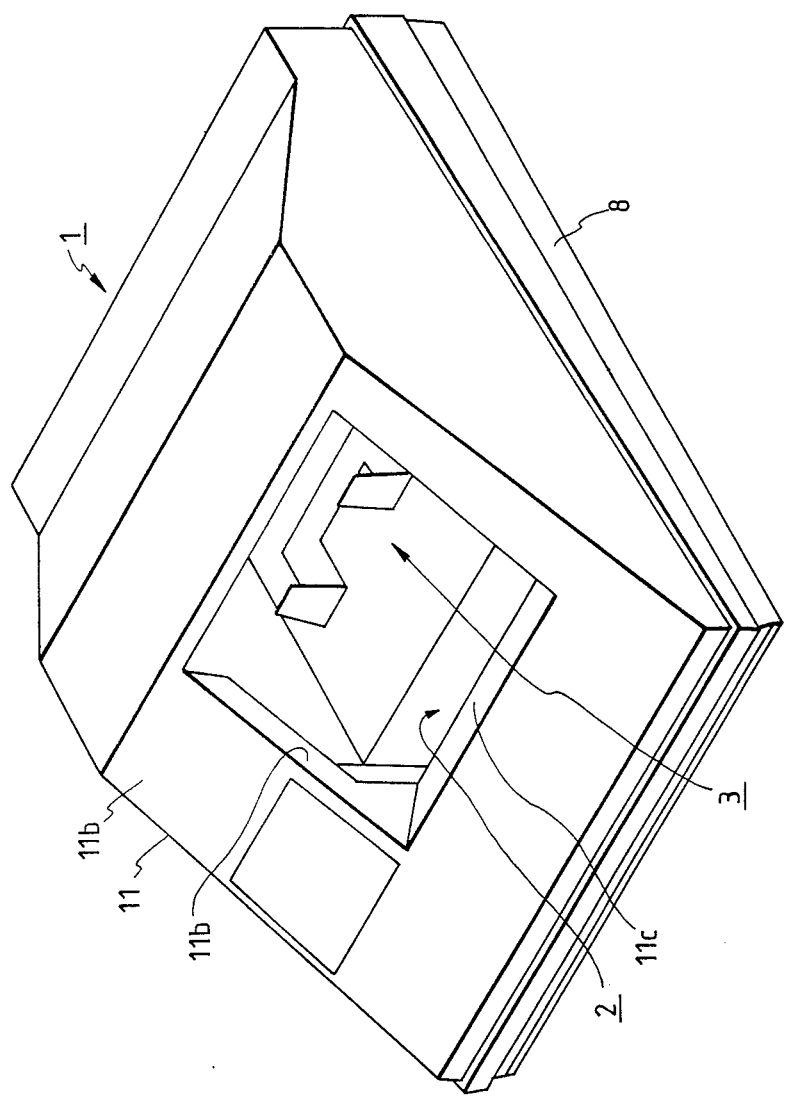
FIG. 4 shows an external perspective view of the apparatus of FIG. 1.
Figure 5:
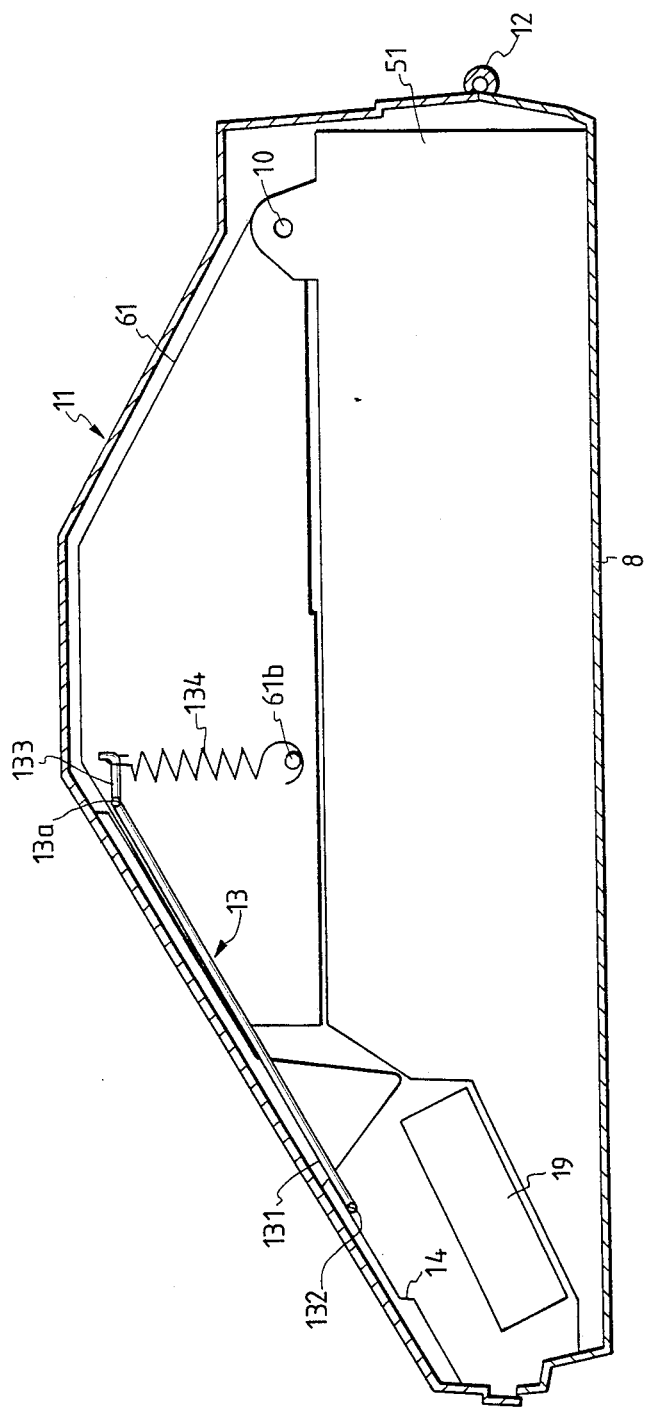
FIG. 5 shows a side view illustrating mounting of a lever of the apparatus of FIG. 1.
Figure 6:
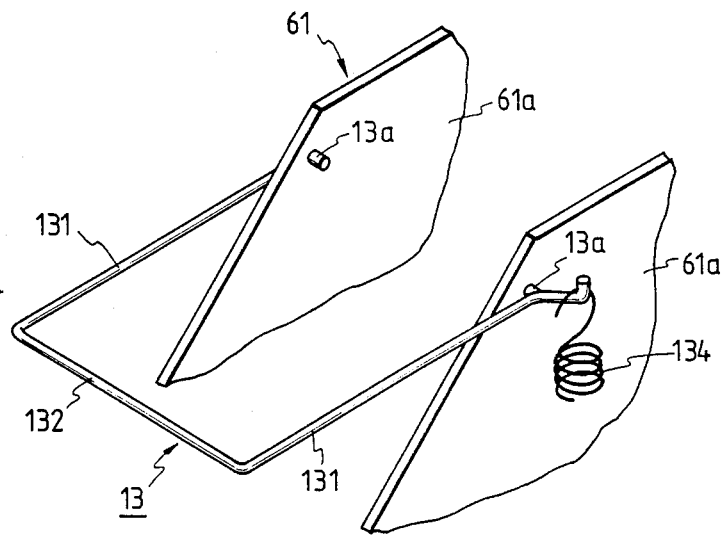
FIG. 6 shows a perspective view of the lever of FIG. 5.

In the present embodiment, when the film is to be exchanged, the outer cover 11 is opened forward around the hinge 12 at the rear end of the outer cover 11 as shown in FIG. 3. As the outer cover 11 is opened forward, the inspection and cleaning of the apparatus can be effected through the front of the apparatus. As shown in FIG. 4, the downstream feed unit 6 can also be opened forward around the hinge 10, and the jam elimination process in the upstream feed unit 5 can also be effected through the front of the apparatus.

In the present embodiment, the rotary camera which uses the film F as the recording medium is described. The present invention is also applicable to a copying machine which uses a photoconductor as the recording medium. It is also applicable to a record apparatus such as a facsimile machine in which an image is read by an image sensor such as CCD and it is converted to an image signal and the image is recorded on a print sheet in accordance with the image signal, or an image processing apparatus which stores the image signal in a digital form on a magnetooptical disk, optical disk, magnetic disk or magnetic tape. For example, the image of the document may be read by arranging a line image sensor such as CCD at the position of the microfilm F. Two line image sensors may be arranged linearly along the width of the film and positioned on the focus plane of the focusing lens 76 so that one of the image sensors reads the front side of the document and the other image sensor reads the rear side of the document, and the image signals from the sensors are digitized and they are recorded on the optical disk.

Since the last stage reflection means is arranged backwardly of the apparatus relative to the recording medium arranged in the front of the apparatus, the distance between the recording medium and the last stage reflection means is large and the reflection surface of the last stage reflection means such as mirror need not be polished with high precision. Thus, the cost can be reduced. Since the highest last stage reflection means is arranged in the rear of the apparatus, the space in the front of the apparatus can be saved and the compact apparatus can be provided.

When the microfilm F is to be loaded or unloaded, or the inside of the apparatus is to be inspected, the outer cover 11 is opened so that it is done through the front of the apparatus. In the embodiment shown in FIG. 1, when the outer cover 11 is opened, the lever 13 is rotated and stopped at the intermediate hold position B. Under this condition, the horizontal shaft 132 at the end of the lever 13 is latched by the latch 14 on the inner surface of the outer cover 11 so that the outer cover 11 is held at the half-open position as shown in FIG. 2. As the outer cover 11 is held at the intermediate position, the end of the outer cover 11 is not so far from the working position (in front of the apparatus) of the operator and the operator can graspe the end of the outer cover 11 by slightly moving from the position where the operator exchanges the microfilm F. Thus, the operator can readily open and close the outer cover 11. When the outer cover 11 is to be closed, the outer cover 11 is slightly lifted to disengage the lever 13 from the latch 14 and then the outer cover 11 is fully closed.

As shown in FIG. 7, the handle 135 may be provided in the horizontal shaft 132 at the end of the lever 13 to facilitate the operation of the lever 13 and improve the operability. As shown in FIG. 8, the relock prevention cam 15 may be provided in the outer cover 11 to prevent relocking which would occur when the outer cover 11 is closed. Thus, the operability is further improved.

In the jam elimination process for the object S or the inspection of the inside of the apparatus, the outer cover 11 is opened as shown in FIG. 3 and the downstream feed unit 6 is rotated around the hinge 10 so that it is opened separately from the upstream feed unit 5. Accordingly, the status of the upstream feed unit 5 and the downstream feed unit 6 in the apparatus as well as the inside of the apparatus including the optical system 7 to the drive unit (not shown) can be observed at a glance. Even if the jam occurs at the lower upstream feed unit 5, the operator can conduct the jam elimination process from the upper area of the apparatus while the operator sits in front of the apparatus.

While not shown, a torsion bar may be provided in the downstream feed unit 6 to support the weight of the downstream feed unit 6 so that the desired open angle is maintained. A stop mechanism may be provided as is done for the lever 13 for the outer cover 11.

In the present embodiment, not only the supply unit 2 and the ejection unit 3 but also the film chamber 19 for the microfilm F are arranged in the front of the apparatus so that the film can be loaded and unloaded and the object S can be supplied and ejected from the front of the apparatus. The jam elimination process and the inspection can also be conducted from the front of the apparatus so that the operation is simplified and the maintenance is facilitated.

Since the outer cover and the downstream feed unit can be separately opened and closed from the upstream feed unit, the status of the inside can be readily checked by opening the outer cover and the downstream feed unit and a large space for operation is provided. Thus, the jam elimination process and the inspection and maintenance work can be very easily conducted.

Figure 12A:
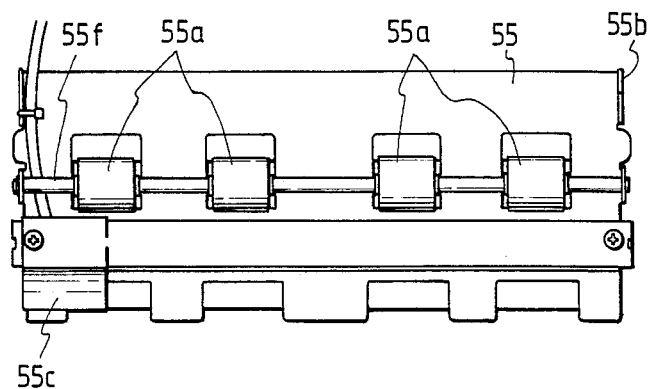
FIG. 12A shows a plan view of a guide plate.
Figure 12B:
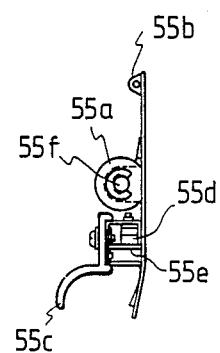
FIG. 12B shows a side view of the guide plate.

FIGS. 12A and 12B show the guide plate 55, in which FIG. 12A shows a plan view and FIG. 12B shows a side elevational view. The guide plate 55 is movably attached to the horizontal feed path 52 to open and close it to facilitate the cleaning of the convey belt 54 and the sensor 55d in the horizontal feed path 52. The guide plate 55 is provided with four guide rollers 55a which are rotatable around a longitudinal shaft 555, and they abut against the convey belt 54 to follow it when the guide plate 55 is closed. A handle 55c to pull up the guide plate 55 is provided at the left end upstream of the feed of the object along the guide plate 55, and the guide plate 55 is latched at the pulled-up position by latch means (not shown).

Figure 13:
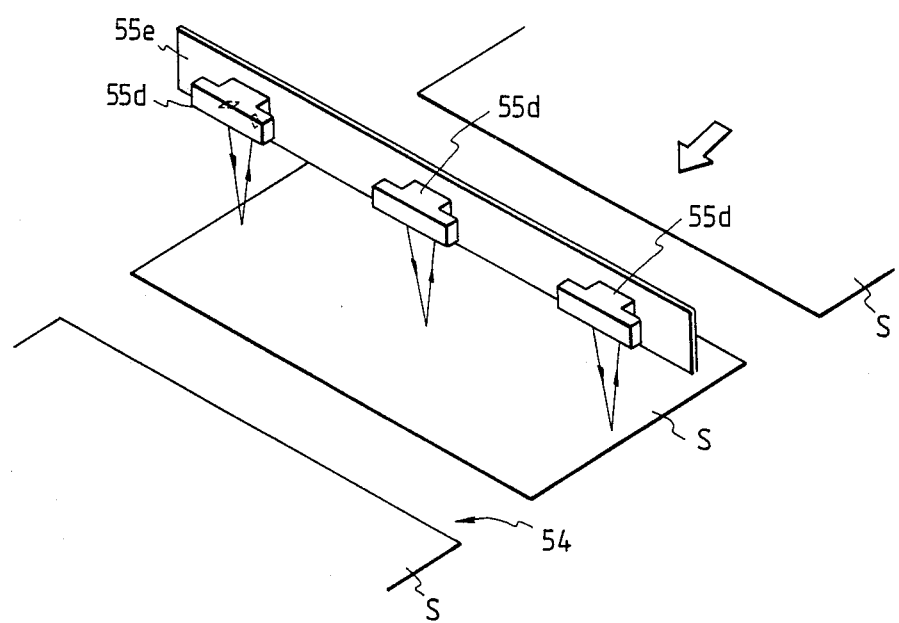
FIG. 13 shows a perspective view illustrating a vicinity of a sensor in an enlarged scale.

The sensor 55d is a reflection type photo-sensor which is fixed below the handle 55c of the guide plate 55 through the printed board 55e. If comprises a light source for illuminating the convey belt 54 and a photo-sensor for detecting the reflection light from the convey belt. As shown in FIG. 13, three sensors 55d are provided longitudinally of the printed board, and they detect the object S such as a check fed by the convey belt 54 and send the detection signals to a counter (not shown). The sensors 55d also function to prevent failure of closing the guide plate 55. If the apparatus is operated while the guide plate 55 is not closed, the object S which is fet at a high speed may be jammed in the horizontal feed path 52. In order to prevent this from occurring, if the guide plate 55 is left open and the sensor S does not sense the reflection light from the convey belt 54, a signal is sent (or not sent) to a CPU (not shown) which issues a signal to instruct to display the failure of closing of the guide plate 55 on a display unit (not shown), and inhibits the photographing operation.

In the present embodiment, since the guide plate 55 can be opened and closed, the convey belt 54 and the sensor 55d in the horizontal feed path 52 can be readily cleaned and the clean status thereof can be checked without any special cleaning tool for cleaning the sensor. Since the sensor 55d is attached to the openable guide plate 55 to detect the object S and the position of the guide plate 55, the jamming due to the open state of the guide plate 55 can be prevented and the total number of sensors can be reduced. Thus, the apparatus can be simplified and reduced in size.

Since the guide member for the object is movable to the feed path to open and close it, the cleaning in the feed path is facilitated and the jam elimination process can be quickly conducted. Since the guide means is provided with the detection means, the detection means can be readily cleaned without special cleaning tool and the clean status can be easily checked.

Since the object and the open/close status of the guide member are detected by the detection means provided on the guide means, the detection means can be omitted so that the total number of detection means is reduced. Thus, the apparatus is simplified, reduced in size and the cost is reduced.

Figure 14:
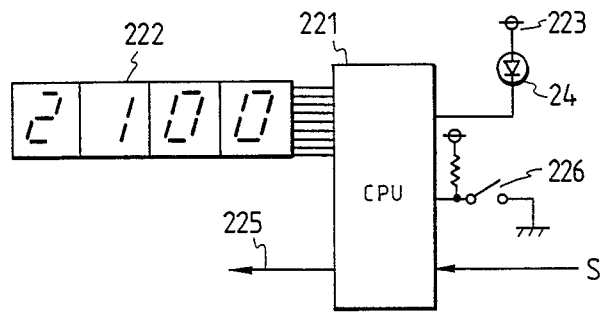
FIG. 14 shows a circuit diagram of a control unit.
Figure 15:
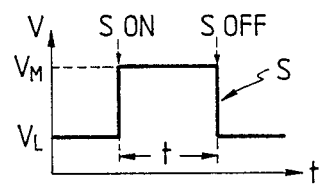
FIG. 15 shows a timing chart of object detection means.

FIG. 14 shows a block diagram of the control unit of the present embodiment. Numeral 221 denotes a CPU as a controller, numeral 222 denotes a 7-segment LED for displaying the number of frames photographed, numeral 223 denotes an LED drive signal for driving an LED lamp 224, numeral 225 denotes a drive signal for the feed roller 27 which serves as the feed means, numeral 226 denotes a switch which serves as stop release means, and S denotes an object detection signal which is produced when the sensor 55d detects the object.

Figure 16:
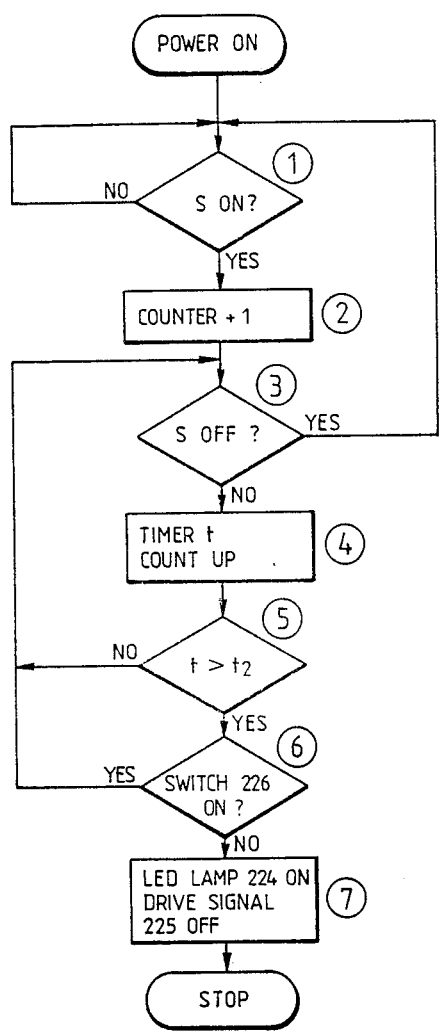
FIG. 16 shows a flow chart of the operation of the control unit.

FIG. 16 shows a flow chart for the operation of the control unit of the present embodiment. In a step ①, when the object detection signal S is produced, the frame counter of the CPU 221 is incremented by one. As a result, the 7-segment LED 222 updates the number of frames (step ②). Then, during the presence of the object detection signal S, a timer t (built in the CPU 21) which serves as object presence detecting means for detecting the presence of the object S in the feed path is counted up (steps ③ and ④).

A time $t_1 = l_{max}/v$ required for a possible maximum length of document permitted for photographing to pass through the sensor 7 is predetermined, where v is a feed velocity of the object S. If the timer t exceeds an upper limit $t_2 (>t_1)$, it is an indication that the object S remains at the position of the sensor 55d (step ⑤). If the switch 226 is on, the object residence indication and the stop of feed are not effected even if the timer t exceeds the upper limit $t_2$ (step ⑥). In the step ⑥, if the switch 226 is off, the LED lamp 224 is lit in a step ⑦ to indicate the residence and the feed roller drive means (not shown) is deenergized to stop the feed roller 22 so that further feed of the object and the photographing are inhibited.

Figure 17:
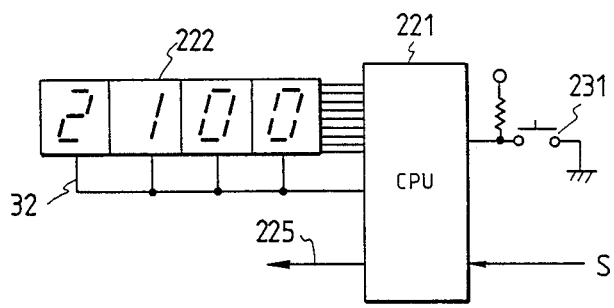
FIG. 17 shows a circuit diagram of a second embodiment of a control unit.
Figure 18:
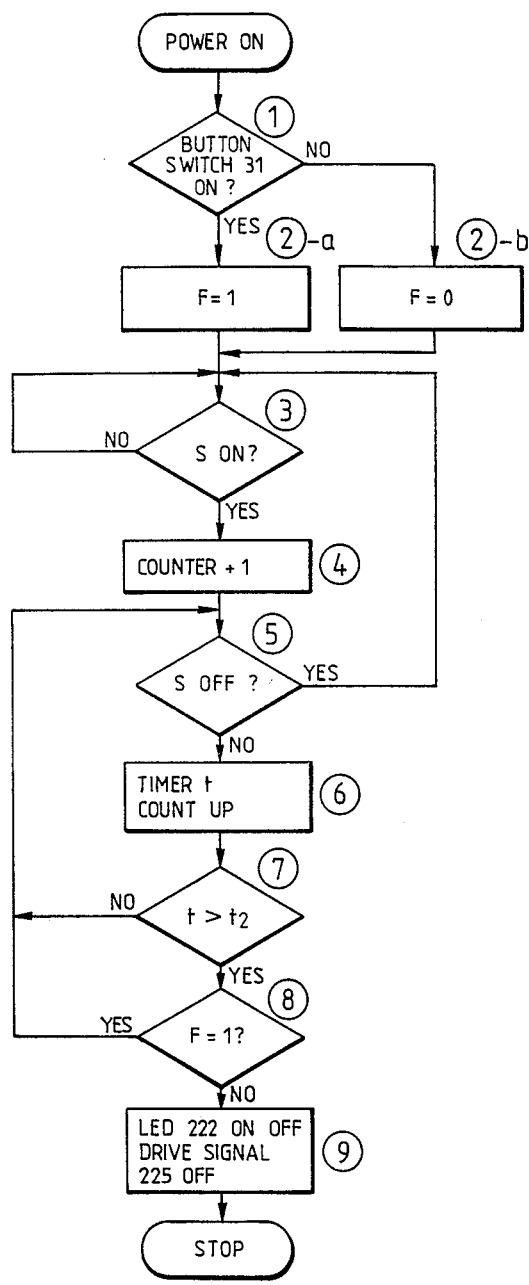
FIG. 18 shows a flow chart of the operation of the control unit in the second embodiment.

FIG. 17 shows a circuit diagram of other embodiment of the control unit, and FIG. 18 shows a flow chart of the operation of the control unit. The like elements to those shown in the previous embodiment are designated by the like numerals. In the present embodiment, numeral 231 denotes a push button switch which serves as the stop release means. If the switch 231 is turned on when the power is turned on, the feed stop release flag F in the CPU 221 is set to "1". The push button switch 231 may be used, other than when the power is turned on, for other function such as to reset a counter (not shown) which counts the number of frames to be displayed on the 7-segment LED 222.

The operation of the present embodiment is explained with reference to the flow chart of FIG. 18. If the push button switch 231 is in the on position in the step ①, the feed stop release flag F is set to "1" (step ② -a). If it is in the off position, the flag F is set to "0" (step ② -b). In a step ③, if the object detection signal S is turned on, the frame counter of the CPU 221 is incremented by one. As a result, the 7-segment LED 222 updates the count indication (step ④ ). When the object detect signal S is turned on, the timer t counts up (steps ⑤ and ⑥ ). In a step ⑦ , if the timer t>t₂ and the object residence is detected, the drive signal 225 is turned off to inhibit the photographing only if the flag F is "0" (steps ⑧ and ⑨ ). In this case, the LED drive signal 232 is sent at a predetermined interval to flash the LED 222 in order to alert the object residence. Other construction and function are identical to those of the previous embodiment and the explanation thereof is omitted.

Figure 19:
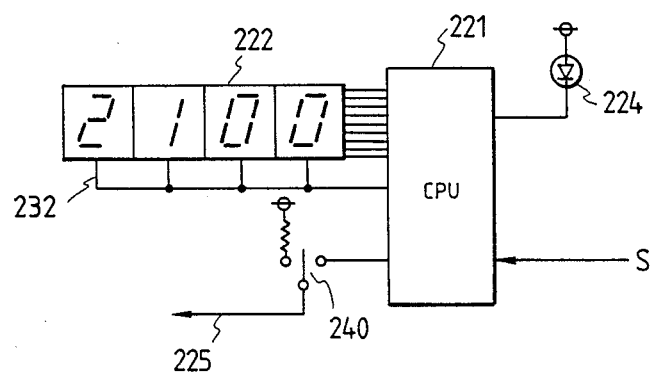
FIG. 19 shows a circuit diagram for connection of switches.

In the above embodiments, whether the feed of the object is to be stopped or not is selected by the switch connected to the CPU 222. Alternatively, as shown in FIG. 19, the drive signal 225 for the feed roller 22 may be directly selected by the switch 240. In the above embodiments, if the siwtch 26 or the flag F is in the state to release the feed stop when the object residence is detected, both the object feed stop and the residence alert indication are inhibited. Alternatively, the residence alarm may be indicated whenever the object residence is detected and only the object feed stop may be inhibited. Further, the upper limit t₂ of the timer t may be set to any value.

In the above embodiments, the reflection type photosensor is used to detect the object, although any electrical means or other mechanical means such as microswitch or CCD which can detect the length of the object may be used, and the position of arrangement and the number are not restrictive.

The display/alarm means may be buzzer or voice means so long as the operator can clearly recognize it.

In the above embodiments, when the feed of the object is stopped if the object resides, the shutter opening operation and the film drive are inhibited so that a safer operation is assured.

When a normal document is to be recorded, the feed of the document is stopped when the residence of document is detected to prevent the break of the document and the apparatus. If the stop release status is set, a document having more than a predetermined length can be recorded so that the efficiency is improved and the flexibility is expanded.

Figure 20:
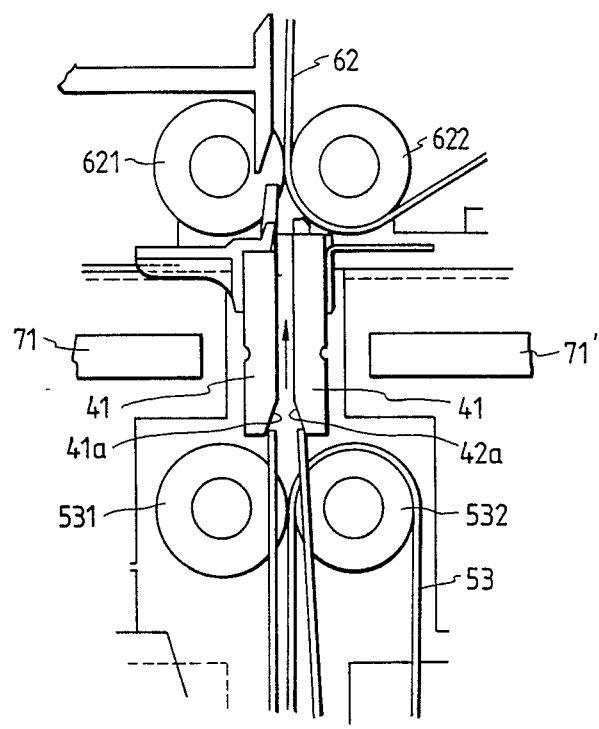
FIG. 20 shows a configuration of a photographing unit.
Figure 21:
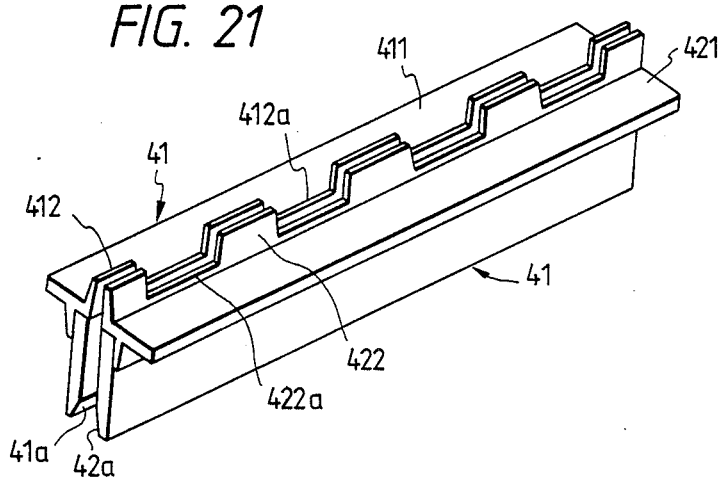
FIG. 21 shows a perspective view of a guide glass.

As shown in FIGS. 20 and 21, the guide glass 41 of the photographing unit 4 has notched guide areas 41a and 42a formed at a lower edge thereof to positively guide the object S to the photographing position. Handles 411 and 421 extending horizontally to form handle members are attached to the guide glass 41. Thus, when the second frame 61 is opened and the guide glass 41 is to be taken out for cleaning, it can be readily taken out. Since the handles 411 and 421 are arranged on the opposite sides to the notched guide areas 41a and 42a of the guide glass 41, on the upper edge of the guide glass 41, wrong arrangement thereof when they are mounted on the first frame 51 is prevented. If they are to be mounted in the wrong arrangement, the handles 411 and 421 abut against each other and they cannot physically mounted. Since the handles 411 and 421 extend horizontally, they also function as position indication means for indicating the mounting position of the guide glass 41. As a result, the jam of the object due to wrong arrangement of the guide glass 41 can be significantly reduced.

Guides 412 and 422 extending vertically upward to function as feed direction defining means are integrally formed with the handles 411 and 421, respectively. The guides 412 and 422 have notches 412a and 422a formed longitudinally thereof at a predetermined interval to assure smooth rotation of the fifth and sixth rollers 621 and 622. The object S fed to the guide glass 41 is restricted in its horizontal movement by the guides 412 and 422 until it reaches the fifth and sixth rollers 621 and 622. Thus, the feed of the object S in the photographing unit 4 is stabilized. Since the upper ends of the guides 412 and 422 extend to the vertical mount positions of the fifth and sixth rollers 621 and 622, the object S is positively fed to the fifth and sixth rollers 621 and 622.

In the above embodiment, the handle 411 and 421 as the position indication means for indicating the mounting position of the guide glass 41 are horizontally formed over the entire length of the guide glass 41, although they need not be arranged over the entire length but may be arranged partially. Any members which disable the mounting if the guide glass 41 is wrongly arranged may be provided.

Since the mounting position indication means are provided on the pair of guide glass plates, they are prevented from being wrongly arranged and the jam of the object is significantly reduced. Further, since the pair of guide glass plates are provided with the feed direction defining means, the feed of the object in the photographing unit is stabilized and a high quality photograph image can be produced.

Figure 22:
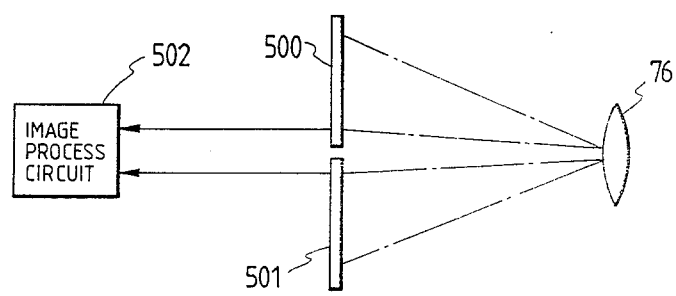
FIG. 22 shows a configuration of the image recording apparatus.
Figure 23:
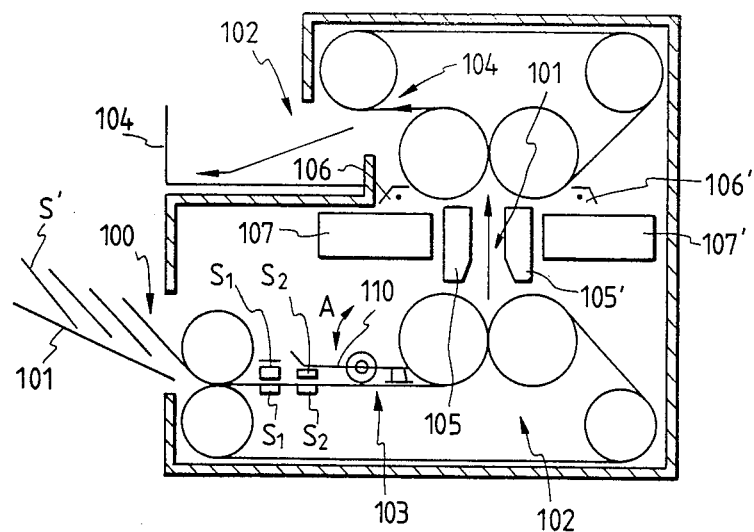
FIG. 23 shows a longitudinal section view of a prior art image recording apparatus.

FIG. 22 shows an object reader. Two line image sensors 500 and 501 are arranged at the focusing position of the projection lens 76. The image sensor 500 reads the image on the front side of the object, and the image sensor 501 reads the image on the rear side. The longitudinal direction of each sensor is perpendicular to the direction of movement of the image at the focusing position, and the sensors are arranged on a line. Output signals from the sensors are digitized by an image processing circuit 502 and they are sent to a storage such as an optical disk or a recorder such as an ink jet printer.

We claim:

1. An image recording apparatus comprising:
   a base provided with an original supply unit and a recording unit;
   a first path provided at the base and leading an original from the supply unit to the recording unit;
   a second path arranged over the first path and leading the original from the recording unit to an ejection unit, the recording unit including optical means for leading an image on the original to a recording medium, the optical means being arranged between the first path and the second path;
   a frame provided with the second path and supported to the base movably between a position where the first path and the optical means are revealed and a position where the first path and the optical means are hidden; and
   a cover member arranged above the frame and supported to the base movably between an open position where the second path is revealed and a closed position where the second path is hidden.

2. An image recording apparatus according to claim 1, wherein the ejection unit includes a tray for receiving an original ejected from the second path, the tray being disposed at the frame.

3. An image recording apparatus according to claim 2, further comprising a lever having one end thereof pivoted to the frame and being able to be rotated as the cover member is opened and closed, wherein the cover member has a latch for latching an end of the lever when the cover member is opened by a predetermined angle.

4. An image recording apparatus according to claim 1, wherein the optical means includes a plurality of mirrors for leading images on both sides of the original to the respective recording medium.

5. An image recording apparatus according to claim 1, wherein the supply unit and the ejection unit are arranged at an end side of the base, and the frame and the cover member being supported rotatably about another end side of the base.

6. An image recording apparatus according to claim 1, wherein a document guide member and document detection means are arranged along the document feed path, the document guide member is able to be opened and closed to the document feed path, and the document detection means is arranged on the document guide member.

7. An image recording apparatus according to claim 6, wherein the document detection means includes a light source for illuminating the document feed path and a photo-sensor for detecting a reflection light from the document feed path to detect the presence or absence of the document and the open/close status of the document guide member.

8. An image recording apparatus according to claim 1, wherein the optical means includes a plurality of mirrors for sequentially reflecting the image light of the document and directing it to the recording medium, a last stage mirror of the plurality of mirrors which lastly reflects the image light to the recording medium is positioned at a highest level, and the mirrors are arranged such that an angle between an optical axis of an incident light to the last stage mirror and an optical axis of the reflected light is acute.

9. An image recording apparatus according to claim 8, wherein the plurality of mirrors direct the image lights of both sides of the document to the recording medium.

10. An image recording apparatus according to claim 1, further comprising a pair of document guide members arranged on both side of the first feed path and handle members provided in the document guide members for loading and unloading the document guide members to and from the base, wherein indication means for indicating the mounting positions of the guide members to the base are provided on the handle members.

11. An image processing apparatus comprising:

a first frame provided with an original supply unit;

reading means for reading an image of an original, the reading means including optical means for projecting the image on the original supplied from the supply unit;

a first conveying means provided at the first frame, the first conveying means conveying an original in the supply unit to a reading position of the reading means through a first path;

a second conveying means arranged above the optical means and for conveying the original fed through the first path, to an ejection unit through a second path, the optical means being arranged above the first path; and a second frame supporting the second conveying means, the first frame and the second frame being relatively rotatable to open the first path and the optical means.

* * * * *

UNITED STATES PATENT AND TRADEMARK OFFICE
CERTIFICATE OF CORRECTION

PATENT NO. : 4,969,009

DATED : November 6, 1990

INVENTOR(S) : Kazuhide SUGIYAMA, ET AL.

It is certified that error appears in the above-identified patent and that said Letters Patent is hereby corrected as shown below:

On the title page:
AT [56] References Cited
U.S. PATENT DOCUMENTS:

"2,984,150  12/1956 Osgood, Jr." should read
--2,984,150  5/1961 Osgood, Jr.--.

COLUMN 1:

Line 13, "or" should read --as-- and "as" should read --or--; and

Line 63, "front" should read --front,--.

COLUMN 6:

Line 18, "bent" should read --bend--.

COLUMN 7:

Line 3, "lower 13" should read --lever 13--; and

Line 55, "periphy" should read --periphery--.

UNITED STATES PATENT AND TRADEMARK OFFICE
CERTIFICATE OF CORRECTION

PATENT NO. : 4,969,009
DATED : November 6, 1990
INVENTOR(S) : Kazuhide SUGIYAMA, ET AL.

It is certified that error appears in the above-identified patent and that said Letters Patent is hereby corrected as shown below:

COLUMN 11:

Line 40, "If" should read --It--; and

Line 50, "fet" should read --fed--.

COLUMN 12:

Line 34, "time $t_1 = \ell_{max}/v$" should read --time $t_1 = \ell_{max}/v$--;

Line 42, "step ⑥" should read --step ⑥,--; and

Line 43, ", if" should read --if--.

COLUMN 13:

Line 58, "cannot" should read --cannot be--.

Signed and Sealed this

Twenty-fifth Day of August, 1992

Attest:

DOUGLAS B. COMER

Attesting Officer

Acting Commissioner of Patents and Trademarks